Dec. 18, 1934.  W. G. G. GODRON  1,984,409

COMBINED PISTON AND RING STRUCTURE

Filed Oct. 31, 1933

INVENTOR
WILLIAM G. G. GODRON
BY
ATTORNEY

Patented Dec. 18, 1934

1,984,409

UNITED STATES PATENT OFFICE 1,984,409

COMBINED PISTON AND RING STRUCTURE

William G. G. Godron, New York, N. Y.

Application October 31, 1933, Serial No. 695,970

11 Claims. (Cl. 309—31)

This invention relates to pistons and other reciprocating members and to rings or sealing devices employed in connection with the ring groove or grooves of said member; and the object of the invention is to so shape and form the walls of the ring groove as to provide means for exposing one side surface of a ring arranged in said groove to the prevailing pressure as well as for exposing the opposite side surface of the ring to said pressure to provide free movement of the ring within the ring groove in the operation of said reciprocating member; a further object being to provide means whereby the prevailing pressure may pass to an annular groove on the outer bearing surface of the ring to relieve the pressure of the ring upon the cylinder wall; a further object being to so construct the ring groove of the reciprocating member as to prevent or substantially prevent a blow-by of the prevailing pressure between the lower surface of the ring and an outer circumferential wall on the reciprocating member engaged by said ring; a further object being to support and guide the ring in the ring groove of said reciprocating member so as to maintain the outer bearing surface thereof in substantially parallel relation with respect to the cylinder wall; and with these and other objects in view, the invention consists in a device of the class and for the purpose specified, which is simple in construction, efficient in use and which is constructed as hereinafter described and claimed.

The invention is fully disclosed in the following specification, of which the accompanying drawing forms a part, in which the separate parts of my improvement are designated by suitable reference characters in each of the views, and in which.

Figure 1:
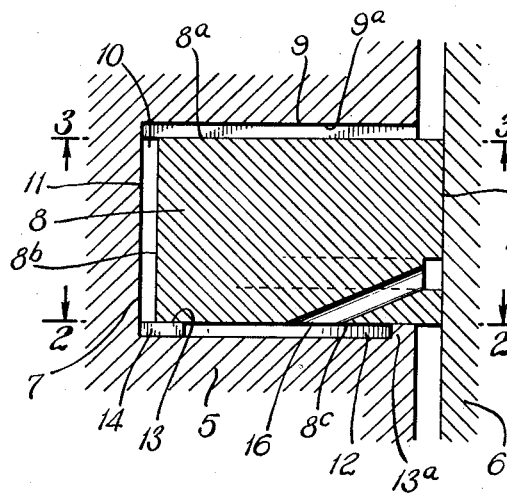
Fig. 1 is an enlarged, sectional detail view indicating part of a piston or other reciprocating member and cylinder wall, with a ring disposed in the ring groove of said member and engaging the cylinder wall.
Figure 2:
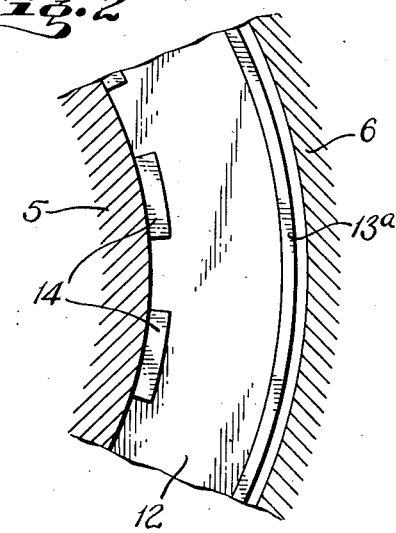
Fig. 2 is a partial section on the line 2—2 of Fig. 1.
Figure 3:
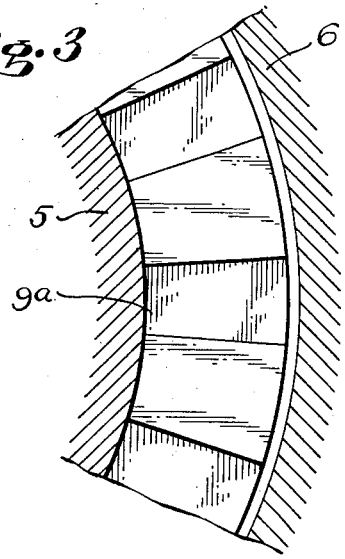
Fig. 3 is a partial section on the line 3—3 of Fig. 1.

In Figs. 1 to 3 inclusive, I have indicated at 5 a part of a piston or other reciprocating member; at 6 a part of a cylinder wall in which the member 5 operates; and at 7 a ring groove for receiving a sealing device or ring 8. In the construction shown, the upper side wall 9 of the ring groove has a plurality of circumferentially spaced radial grooves 9a to permit the passage of prevailing pressure over the upper side surface 8a of the ring into the space 10 between the inner surface or wall 11 of the ring groove and a corresponding inner or back surface 8a of the ring.

This pressure also extends into a wide but comparatively thin circumferential recess or groove 12 formed in the lower surface or wall 13 of the ring groove so that this prevailing pressure will act upon the lower surface 8c of the ring to prevent excessive frictional engagement of the ring with the surface 13, and in fact, to provide a substantially full floating mounting of the ring in the ring groove 7. The inner portion of the surface 13 is also fashioned to form a plurality of radial passages 14, note Fig. 2 of the drawing, which place the groove 12 in communication with the space 10 at the back of the ring.

The ring 8 seats on the surface 13 and a substantial seal is affected by the outer annular flange portion 13a of said surface formed by the groove 12. In other words, this flange 13a serves to check, at least to a major degree, the escape of the prevailing pressure, it being understood that some escape is bound to occur by virtue of the usual clearances allowed between the surfaces of the ring and the ring groove to provide free radial expansion and contraction of the ring 8, especially when a split ring is employed.

The outer or front surface 8d of the ring has a circumferential groove 15 intermediate the surfaces 8a, 8c and this groove is placed in communication with the groove 12 by a plurality of radial passages 16 spaced circumferentially of the ring. With this construction, the prevailing pressure entering the groove 12 as above stated will pass through the passages 16 into the groove 15 to relieve the pressure of the surface 8d of the ring upon the cylinder wall and provide a substantially full floating mounting of the ring in the cylinder and piston structure.

Figure 4:
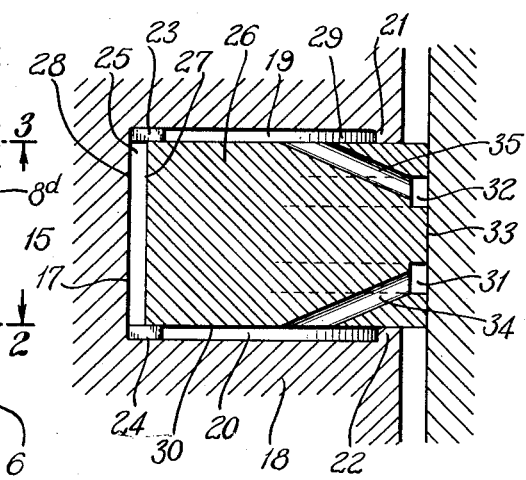
Fig. 4 is a view similar to Fig. 1 but showing a modification.

In Fig. 4 of the drawing, I have shown a slight modification which differs from the structure shown in the other figures, primarily in adapting the device to a double acting piston or reciprocating member. With this construction, the ring groove 17 of the piston or other member 18 has on the upper and lower surfaces or walls thereof, annular recesses or grooves 19 and 20 similar to the recess or groove 12. These grooves are bounded at their outer sides by flanges 21 and 22 similar to the flanges 13a, and radial ports or passages 23 and 24 place the inner sides of the grooves 19 and 20 respectively in communication with the clearance space or chamber 25 formed between the back surface 26 of the ring and the inner wall 28 of the groove 17.

In this construction it will be apparent that with the slight clearance usually prevailing between the upper and lower side surfaces 29 and 30 of the ring, the prevailing pressure will be admitted between the flange 21 and surface 29 and flange 22 and surface 30 in the opposed strokes of the member 18 to allow this pressure to enter the grooves 19 and 20 respectively and the chamber 25 and to extend into opposed grooves 20, 19 from the radial passages 24, 23, and in both instances, to extend into circumferential grooves 31 and 32 on the front bearing surface 33 of the ring through radial ports 34 and 35 communicating with the grooves 20 and 19 respectively.

At this time, it will be apparent that the grooving of the upper surface or wall 9 of the ring groove 7 as at 9a in the construction shown in Figs. 1 to 3 inclusive is not absolutely essential as the normal clearance space provided in most cases will be sufficient to allow the prevailing pressure to pass into the chamber 10, it being understood that the ring 8 is forced by said prevailing pressure down against the bottom wall or surface 13 of the ring groove which includes the surface of the flange portion 13a formed by the groove 12.

It will be apparent that by constructing the ring grooves of pistons or other reciprocating members in the manner illustrated in Figs. 1 and 4 of the drawing, rings of conventional construction and design may be arranged in said grooves, and still provide for free radial movement of the ring with respect to the piston by eliminating the excessive friction between the side surface of the ring and ring groove opposed to that to which the pressure is subjected, and this result can be accomplished without including the circumferential groove or grooves in the outer bearing surface of the ring and the radial ports associated therewith.

Having fully described my invention, what I claim as new and desire to secure by Letters Patent, is:—

1. In a reciprocating member having a ring groove in which a ring is mounted, means for balancing the ring in said groove and reducing the frictional engagement of the side walls of the ring with adjacent walls of the ring groove, said means comprising a circumferential recess in one side wall of the ring groove disposed inwardly of the outer surface of said member, a recess in the opposed wall of said groove whereby a prevailing pressure upon one side surface of the ring in said groove is permitted to pass to the other side surface of said ring to substantially balance the ring in said groove, and the first side wall of the ring groove having circumferentially spaced passages placing said recess in communication with a space formed between the back wall of the ring groove and the back wall of said ring.

2. In a reciprocating member having a ring groove in which a ring is mounted, means for balancing the ring in said groove and reducing the frictional engagement of the side walls of the ring with adjacent walls of the ring groove, said means comprising a circumferential recess in one side wall of the ring groove disposed inwardly of the outer surface of said member, a recess in the opposed wall of said groove whereby a prevailing pressure upon one side surface of the ring in said groove is permitted to pass to the other side surface of said ring to substantially balance the ring in said groove, the first side wall of the ring groove having circumferentially spaced passages placing said recess in communication with a space formed between the back wall of the ring groove and the back wall of said ring, the front surface of the ring having a circumferential groove, and radial ports for placing said groove in communication with the first named recess.

3. In a reciprocating member having a ring groove in which a ring is mounted, means for balancing the ring in said groove and reducing frictional engagement of the side walls of the ring with adjacent walls of the ring groove, said means comprising a circumferential recess in one side wall of the ring groove disposed inwardly of the outer surface of said member, means whereby a prevailing pressure at the opposite side wall of the ring groove may enter said circumferential recess to substantially balance the ring between said side walls of the ring groove, two circumferential grooves arranged on the front surface of the ring, one of said grooves having radial ports placing the same in communication with the circumferential recess in the first named side wall of the ring groove, and the other circumferential groove having radial ports placing said groove in communication with the opposed side wall of said ring groove whereby the prevailing pressure at both side walls of the ring groove is exposed to the front surface of the ring.

4. In a sealing means for a reciprocating member, said member having a groove in which a sealing device is mounted, said groove having a top side wall exposed to the prevailing pressure when said member is in operation, a back wall and a lower side wall, the lower side wall of said groove having a circumferential recess disposed inwardly of the outer surface of said member leaving a relatively thin circumferential sealing flange at the outer surface of said member upon which the adjacent surface of the sealing device is arranged, and means including said sealing device providing for transmission of said prevailing pressure at said top side wall of the groove to said circumferential recess in the lower side wall, whereby the pressures on opposed sides of said sealing device are substantially balanced.

5. In a sealing means for a reciprocating member, said member having a groove in which a sealing device is mounted, said groove having a top side wall exposed to the prevailing pressure when said member is in operation, a back wall and a lower side wall, the lower side wall of said groove having a circumferential recess disposed inwardly of the outer surface of said member leaving a relatively thin circumferential sealing flange at the outer surface of said member upon which the adjacent surface of the sealing device is arranged, means including said sealing device providing for transmission of said prevailing pressure at said top side wall of the groove to said circumferential recess in the lower side wall whereby the pressures on opposed sides of said sealing device are substantially balanced, the outer peripheral surface of the sealing device having a circumferential groove, and means providing for transmission of said prevailing pressure to said circumferential groove whereby the pressure on the inner peripheral surface of said sealing device is partially counter-balanced, thus reducing the normal outward radial pressure on said sealing device.

6. A reciprocating member having an outer peripheral surface and a circumferential ring receiving groove in which a ring is mounted for free radial movement, said groove being bounded by a back wall and two side walls, one side wall of said groove having a circumferential recess disposed intermediate said outer peripheral surface and said back wall, means including the ring mounted in said groove for exposing said circumferential recess to prevailing pressure existing in the ring groove adjacent the opposite side wall thereof, and said means including passages placing the first named side wall and said back wall in communication.

7. A reciprocating member having an outer peripheral surface and a ring receiving groove bounded by a back wall and two side walls, one of the side walls having a circumferential recess disposed intermediate said outer peripheral surface and said back wall, said side wall also having a plurality of circumferentially spaced ring supporting members disposed radially inwardly of said circumferential recess, and the spaces intermediate said ring supporting members merging into said circumferential recess.

8. A reciprocating member having an outer peripheral surface and a ring receiving groove bounded by a back wall and two side walls, one of the side walls having a circumferential recess disposed intermediate said outer peripheral surface and said back wall, said side wall also having a plurality of circumferentially spaced ring supporting members disposed radially inwardly of said circumferential recess, the spaces intermediate said ring supporting members merging into said circumferential recess, and the other of said side walls having circumferentially spaced radial passages extending inwardly from said outer peripheral surface.

9. The combination of a reciprocating member having an outer peripheral surface and a ring receiving groove bounded by a back wall and two side walls, one of the side walls having a circumferential recess disposed intermediate said outer peripheral surface and said back wall, said side wall also having a plurality of circumferentially spaced ring supporting members disposed radially inwardly of said circumferential recess and the spaces intermediate said ring supporting members merging into said circumferential recess, and a sealing device arranged in the groove of said reciprocating member, said sealing device having a circumferential groove on the outer surface thereof and passages opening through one side surface of said device for placing said circumferential groove in communication with the circumferential recess on the first named side wall of said member.

10. The combination of a reciprocating member having an outer peripheral surface and a ring receiving groove bounded by a back wall and two side walls, one of the side walls having a circumferential recess disposed intermediate said outer peripheral surface and said back wall, said side wall also having a plurality of circumferentially spaced ring supporting members disposed radially inwardly of said circumferential recess and the spaces intermediate said ring supporting members merging into said circumferential recess, a sealing device arranged in the groove of said reciprocating member, said sealing device having a circumferential groove on the outer surface thereof and passages opening through one side surface of said device for placing said circumferential groove in communication with the circumferential recess on the first named side wall of said member, and the front surface of said sealing device having another circumferential groove, and radial passages extending from said groove and opening through the other side surface of the sealing device.

11. The combination of a reciprocating member having an outer peripheral surface and a ring receiving groove bounded by a back wall and two side walls, one of the side walls having a circumferential recess disposed intermediate said outer peripheral surface and said back wall, said side wall also having a plurality of circumferentially spaced ring supporting members disposed radially inwardly of said circumferential recess and the spaces intermediate said ring supporting members merging into said circumferential recess, a sealing device arranged in the groove of said reciprocating member, said sealing device having a circumferential groove on the outer surface thereof, passages opening through one side surface of said device for placing said circumferential groove in communication with the circumferential recess on the first named side wall of said member, and means between the other side wall of said ring groove and the adjacent side surface of said sealing device for forming circumferentially spaced radial passages extending inwardly from the outer peripheral surface of said member.

WILLIAM G. G. GODRON.